US010088884B2

(12) United States Patent
Jaramillo et al.

(10) Patent No.: US 10,088,884 B2
(45) Date of Patent: Oct. 2, 2018

(54) COMMUNICATIONS FOR POWER DELIVERY SOLUTIONS

(71) Applicant: NXP B.V., Eindhoven (NL)

(72) Inventors: Kenneth Jaramillo, Gilbert, AZ (US); Madan Mohan Reddy Vemula, Tempe, AZ (US); Sharad Murari, Gilbert, AZ (US); Abhijeet Chandrakant Kulkarni, Chandler, AZ (US); Krishnan Tiruchi Natarajan, Cuptertino, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/921,276

(22) Filed: Oct. 23, 2015

(65) Prior Publication Data

US 2017/0115711 A1 Apr. 27, 2017

(51) Int. Cl.
*G06F 1/26* (2006.01)
*G06F 1/32* (2006.01)
*G06F 1/00* (2006.01)
*G06F 13/10* (2006.01)
*G06F 13/42* (2006.01)
*H04L 12/10* (2006.01)
*H04L 12/40* (2006.01)

(52) U.S. Cl.
CPC ............ *G06F 1/266* (2013.01); *G06F 13/102* (2013.01); *G06F 13/4282* (2013.01); *H04L 12/10* (2013.01); *H04L 12/40045* (2013.01); *G06F 2213/0042* (2013.01)

(58) Field of Classification Search
CPC ..................................... G06F 1/32; G06F 1/26
See application file for complete search history.

(56) References Cited

U.S. PATENT DOCUMENTS

2006/0092000 A1 5/2006 Karam et al.
2007/0075692 A1* 4/2007 Ostrom .................. G05F 1/618
323/274

(Continued)

OTHER PUBLICATIONS

Universal Serial Bus Type-C Cable and Connector Specification, Revision 1.1, Apr. 3, 2015.

(Continued)

*Primary Examiner* — Phil Nguyen

(57) ABSTRACT

A protocol can specifie a power-sourcing voltage range that indicates power sourcing capabilities. Additional power sourcing capabilities can be communicated using voltage variations within the power-sourcing voltage range. A power-sourcing device can provide power to an external power-sinking device over a wired connection containing a plurality of wires. A voltage control circuit can be configured to drive a voltage over a wire of the plurality of wires. Processing circuitry can communicate, using the voltage control circuit, first power-sourcing capabilities to the external power-sinking device by setting the voltage over the wire to a value within the power-sourcing voltage range. The processing circuitry can also communicate, using the voltage control circuit, the additional power sourcing capabilities of the power-sourcing device using voltage variations on the wire, the voltage variations maintaining voltage on the wire within the power-sourcing voltage range.

20 Claims, 7 Drawing Sheets

(56) References Cited

U.S. PATENT DOCUMENTS

| | | | | |
|---|---|---|---|---|
| 2008/0111522 | A1* | 5/2008 | Simpson | H01M 10/44 320/162 |
| 2010/0052620 | A1* | 3/2010 | Wong | H02J 7/0055 320/137 |
| 2011/0208980 | A1* | 8/2011 | Brooks | G06F 1/266 713/300 |
| 2013/0069600 | A1* | 3/2013 | Knowlton | H02J 7/008 320/162 |
| 2013/0124888 | A1* | 5/2013 | Tanaka | G11C 16/06 713/320 |
| 2013/0290765 | A1* | 10/2013 | Waters | G06F 1/263 713/340 |
| 2014/0075212 | A1* | 3/2014 | Urbina | G06F 1/26 713/300 |
| 2014/0245030 | A1* | 8/2014 | Helfrich | G06F 1/26 713/300 |
| 2015/0046622 | A1* | 2/2015 | Ramirez | G06F 13/409 710/303 |
| 2015/0248151 | A1* | 9/2015 | Lim | G06F 1/266 713/310 |
| 2015/0249393 | A1* | 9/2015 | Zhang | H02M 3/33523 363/21.15 |
| 2015/0268688 | A1* | 9/2015 | Leinonen | G05F 3/02 307/147 |
| 2015/0362984 | A1* | 12/2015 | Waters | G06F 1/3287 713/324 |
| 2016/0064979 | A1* | 3/2016 | Huang | H02J 7/0055 320/114 |
| 2016/0117274 | A1* | 4/2016 | Waters | G06F 13/362 710/106 |
| 2016/0118826 | A1* | 4/2016 | Dong | H02J 7/34 320/107 |
| 2016/0164322 | A1* | 6/2016 | Li | H02J 7/00 320/137 |
| 2016/0181850 | A1* | 6/2016 | Toivola | H02J 7/025 320/108 |
| 2016/0378155 | A1* | 12/2016 | Inha | G06F 1/3287 710/313 |
| 2017/0126039 | A1* | 5/2017 | Nguyen | H02J 7/0052 |

OTHER PUBLICATIONS

Universal Serial Bus Power Delivery Specification, Revision 2.0, Version 1.1, May 7, 2015.

"Universal Serial Bus Power Delivery Specification Revision 1.0"; 328 pages (Jun. 23, 2013.

Abramson, David; "IEEE P802.3bt Mutual Identification"; IEEE802.3bt Interim Meeting (Sep. 2014).

* cited by examiner

COMMUNICATIONS FOR POWER DELIVERY SOLUTIONS

OVERVIEW

Aspects of various embodiments are directed to communicating power sourcing capabilities for various power delivery solutions.

Bus interface protocols can be designed to allow for power to be provided over wired interfaces. This power can be used, in some instances, to charge a battery, or similar self-contained power source, directly power a power-receiving (power-consuming) device, or both charge and directly power. Standards for bus interface protocols can sometimes provide for different power-sourcing capabilities between different power-consuming devices. For example, different power-consuming devices, each using the same wired interface can be configured to draw different amounts of current. Consistent with various aspects discussed herein, the power-providing devices can be configured to communicate their power-sourcing capabilities to the power-consuming device upon connection. In some instances, at least a portion of this communication may involve setting voltage values on wires connecting the devices (e.g., as might be set using pullup/down resistors of set values). Another portion of this communication may involve a relatively complex secondary communication protocol carried out between the devices.

A particular type of bus interface protocol is the Universal Serial Bus (USB). While USB can be used to attach external peripherals to a Personal Computer, it can also be used for interfacings between peripherals, charging thereof and a host of other applications and uses, such as automotive, cameras, smart phones, televisions, and set-top boxes. USB can also be used as a source of power in various mobile device charging solutions. USB provides various different data transfer speeds and charging modes. For example, USB 3.0 provides data transfer speeds up to 5 Gbit/s and USB 3.1 provides data transfer rates of up to 10 Gbit/s. USB also provides various different power providing and sinking capabilities. The new USB Type-C connector can support 5V with 500 mA/900 mA (for USB 2.0/USB 3.1), 1.5 A and 3 A modes. The USB Power Delivery (PD) protocol supports a power negotiation and delivery solution that supports up to 100 W (20V×5 A). PD uses a fairly complex communication protocol to negotiate the power providing capabilities of the devices.

These and other matters have presented challenges to efficiencies of power delivery implementations, for a variety of applications.

SUMMARY

According to various embodiments, an apparatus can be used with a protocol that specifies a power-sourcing voltage range that indicates power sourcing capabilities and for communicating additional power sourcing capabilities using voltage variations within the power-sourcing voltage range. The apparatus can include a power-sourcing device that is configured to provide power to an external power-sinking device over a wired connection containing a plurality of wires. The power-sourcing device can include a voltage control circuit configured to drive a voltage over a wire of the plurality of wires. Processing circuitry can be configured to communicate, using the voltage control circuit, first power-sourcing capabilities to the external power-sinking device by setting the voltage over the wire to a value within the power-sourcing voltage range; and communicate, using the voltage control circuit, the additional power sourcing capabilities of the power-sourcing device using voltage variations on the wire, the voltage variations maintaining voltage on the wire within the power-sourcing voltage range.

According to certain embodiments, an apparatus can be used with a protocol that specifies a power-sourcing voltage range that indicates power-sourcing capabilities and for communicating additional power-sourcing capabilities using voltage variations within the power-sourcing voltage range. The apparatus can include a power-sinking device that is configured to receive power from an external power-sourcing device over a wired connection containing a plurality of wires. The power-sinking device can include a voltage circuit that is configured to detect a voltage that is provided over the plurality of wires. Processing circuitry can be configured to determine power-sourcing capabilities of the external power-sourcing device based upon the detected voltage being within the power-sourcing voltage range; and determine the additional power-sourcing capabilities of the power-sourcing device by decoding data encoded using voltage variations on the wire, the voltage variations maintaining voltage on the wire within the power-sourcing voltage range.

Certain embodiments of the present disclosure are directed toward a method for use with a protocol that specifies a power-sourcing voltage range that indicates power sourcing capabilities and for communicating additional power sourcing capabilities using voltage variations within the power-sourcing voltage range. The method can include providing, from a power-sourcing device, power to an external power-sinking device over a wired connection containing a plurality of wires; driving, using a voltage control circuit of the power-sourcing device, a voltage over a wire of the plurality of wires; communicating, using the voltage control circuit, first power-sourcing capabilities to the external power sinking device by setting the voltage over the wire to a value within the power-sourcing voltage range; and communicating, using the voltage control circuit, the additional power sourcing capabilities of the power-sourcing device using voltage variations on the wire, the voltage variations maintaining voltage on the wire within the power-sourcing voltage range.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
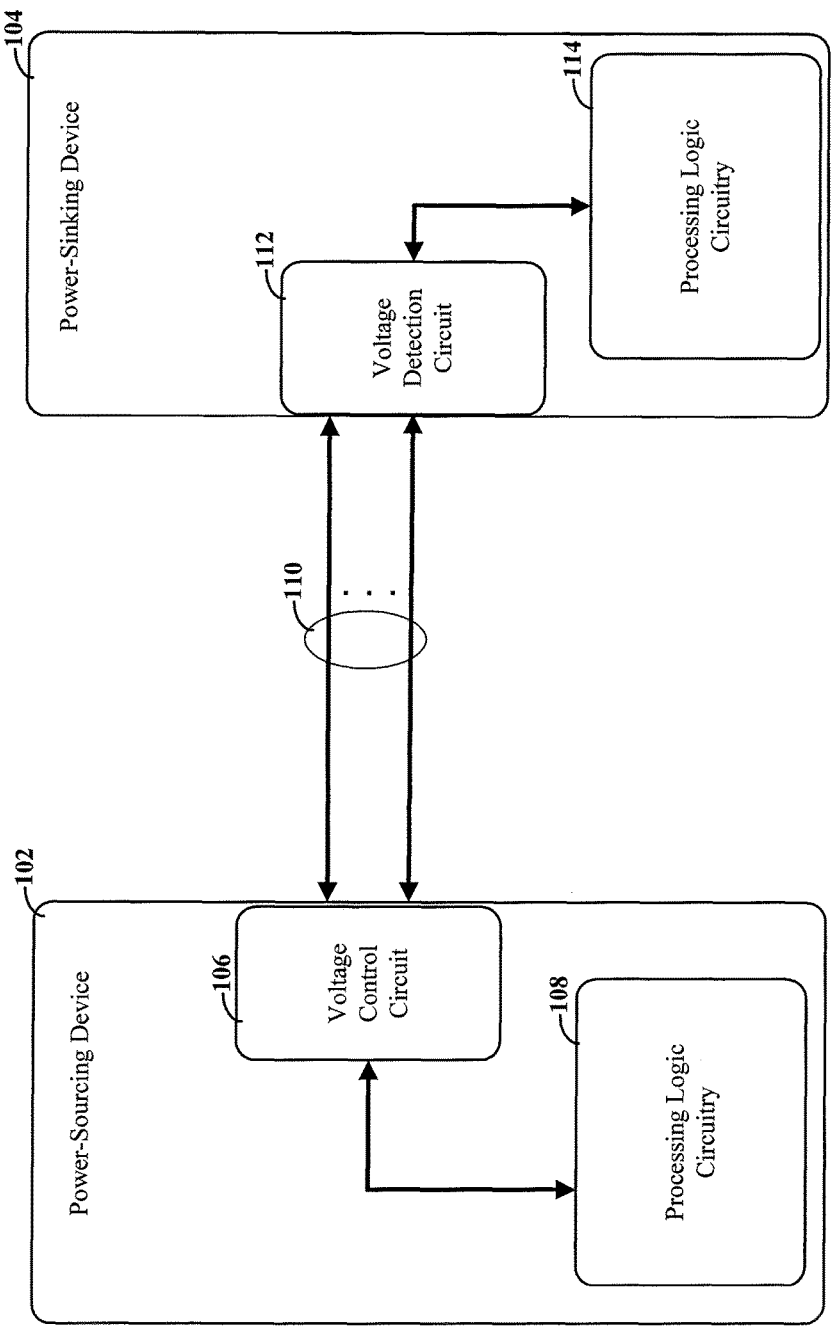
FIG. 1 depicts a block diagram for a system and apparatus for communicating power sourcing capabilities, consistent with embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communication of power delivery capabilities between devices. In certain implementations, aspects of the present disclosure have been shown to be beneficial when used in the context of communicating power-sourcing capabilities using a signal protocol that operates within a voltage range that specifies other power-sourcing capabilities. In some embodiments, power-sourcing capabilities can be communicated between devices that comply with the USB Type-C protocol. These and other aspects can be implemented to address challenges, including those discussed in the background above. While not necessarily so limited, various aspects may be appreciated through a discussion of examples using such exemplary contexts.

Various embodiments are directed toward a system or apparatus that is configured for use with a protocol in which power-sourcing capabilities are communicated by setting a voltage within a voltage range. For instance, the protocol can specify a set of different voltage ranges that each correspond to a different maximum current level. A power-sourcing device can drive a signal line or wire to a voltage that is within a power-sourcing voltage range that corresponds to the maximum current level that the power-sourcing device is capable of providing. Consistent with certain embodiments, the power-source device can be configured to communicate additional power-sourcing capabilities by driving a modulated signal on the wire, where the modulated signal encodes data describing the additional power-sourcing capabilities. According to embodiments of the present disclosure, the modulated signal can be maintained within the power-sourcing voltage range. This can be particularly useful for maintaining compatibility with power-sinking devices that are not configured to detect and decode the modulated signal.

According to various embodiments, the system can be configured for use with a USB Type C connector. USB Type C connectors can be designed to provide power delivery as well as high speed data/video connectivity. The USB Type C Specification defines simple connection detection and power capabilities communications. Power source capabilities are limited to 5 Volts and 3 Amperes (5V/3 A) for non USB PD systems. The use of USB PD allows for power up to 20V@5 A, but this can result in a greater system complexity. For instance, USB PD can be performed by a microprocessor with an addition to the USB software stack to handle USB PD Communications.

Embodiments of the present disclosure relate to the recognition that inexpensive USB devices may not implement USB PD because it can be prohibitively expensive to implement, from both a cost or area perspective. Without USB PD compatibility, the USB specification limits the power-sourcing capabilities to 5V and 3 A power delivery. Some examples of inexpensive USB devices include power bricks and inexpensive smart phones and tablets. Some models of monitors, printers, and hard drives might also fall into this category. Various embodiments also relate to the recognition that electronics devices such as laptops, tablets and smart phones can benefit from higher charger voltage and current (e.g., to allow rapid charging).

According to various embodiments, a power-sourcing device can be configured to provide a voltage that is within the voltage range that specifies 5V and 3 A power delivery capabilities under the USB Type C specification. This indicates to the power-sinking device that the power-sourcing device has the corresponding power-sourcing capabilities of 5V and 3 A. Without needing to resort to use of the full USB PD negotiation and communication protocol, the power-sourcing device can be configured to communicate additional power-sourcing capabilities to the power-sinking device. Moreover, the additional communication can be carried out in a manner that maintains backward compatibility with power-sinking devices that are not configured to decode the additional communication. In particular, the additional communication can be carried out using a signal that stays within the voltage range that specifies 5V and 3 A power delivery capabilities.

The various embodiments discussed herein can be used in connection with a variety of different power delivery solutions and protocols. For ease of discussion, a number of embodiments are discussed in connection with USB, which is a particular example of such protocols. It is understood that the various embodiments are not necessarily so limited.

Turning now to the figures, FIG. 1 depicts a block diagram for a system and apparatus for communicating power sourcing capabilities, consistent with embodiments of the present disclosure. Power-sourcing device 102 can be configured to provide power to a power-sinking device 104. According to various embodiments discussed herein, the power can be provided over one or more wires from a plurality of wires 110. For instance, the wires may be part of a USB cable that is Type-C compliant. The power-sourcing device can be any number of different devices including, but not limited to, power bricks and inexpensive smart phones, tablets, monitors, printers, and hard drives.

According to embodiments of the present disclosure, the power-sourcing device 102 can be configured to provide power to the external power sinking device 104 by first communicating power-sourcing capabilities over the wired connection. Voltage control circuit 106 can be configured to drive different voltages over a wire of the plurality of wires for the purpose of communication with the power-sinking device 104. In certain instances, voltage control circuit 106 can include a plurality of programmable resistors or programmable current sources designed to drive the respective voltages. In such instances, the voltage is driven in combination with presence of an attached power-sinking device, which can also include one or more programmable resistors or current sources. Power sinking device 104 can include a voltage detection circuit 112 that is configured to detect voltage levels that are being driven by the voltage control circuit 106.

According to various embodiments, processing logic circuitry 108 (or just "processing circuit") can be configured to control the voltage control circuit 106 so that it communicates a first set of power-sourcing capabilities to the external power sink. This can include setting the voltage over the wire to a value within a power-sourcing voltage range. Processing circuit 108 can also be configured to communicate, using the voltage control circuit 106, additional power sourcing capabilities of the power sourcing device using voltage variations on the wire. As discussed herein, the voltage variations can be such that they maintain the voltage on the wire within the power-sourcing voltage range (e.g., to allow for backward compatibility with power-sinking devices).

Processing logic circuitry 114 can be configured to determine the first set of power-sourcing capabilities of the external power-sourcing device 102 by using voltage detection circuit 112 to determine that the voltage driven by the power-sourcing device is within a particular power-sourcing voltage range. Processing circuitry 114 can also be configured to determine the additional power-sourcing capabilities of the power-sourcing device by decoding data that was encoded using voltage variations that are transmitted on the same wire as the detected voltage. As discussed herein, the voltage variations can maintain the voltage on the wire within the power-sourcing voltage range.

According to certain embodiments, the voltage variations can be used to encode data using a variety of different encoding schemes. For instance, the voltage variations can be used to generate an oscillating signal that can be modulated to encode the desired data. The modulation can include, for example, phase modulation, frequency modulation, amplitude modulation, and combinations thereof. As a non-limiting example, the modulation scheme can use biphase mark coding (BMC), which is also used for USB PD communications.

According to various embodiments, the apparatus can be configured for use with USB protocols, and specifically, for USB Type C. Each of the power-sourcing device 102 and the power-sinking device 104 can use voltage detection circuits to determine whether a USB cable is attached or detached. This can include the use of programmable pullup and pulldown resistors as defined by the USB Type C. Consistent with embodiments, the logic controlling the programmable pullups and pulldown can be generic to allow for use with a variety of different devices with different power capabilities. Accordingly, the logic on the power-source device can communicate with the power system of the device to determine the power-sourcing capabilities of the power supply. In response, the logic can set the pullup resistor to signal the capability (up to 5V/3 A) to the device on the other side of the cable. On the power-sinking device, the value of the pullup resistor used by the power-sourcing device is detected to determine the power-sourcing capability of the power-sourcing device (up to 5V/3 A) to the local power subsystem.

As discussed herein, the power-sourcing device may be configured to indicate additional power-sourcing capabilities (e.g., higher than 5V/3 A). In such an instance, the logic on the power-source device can be configured to communicate, using the programmable resistors, additional power sourcing capabilities of the power sourcing device using voltage variations on the wire. These additional programmable resistors can correspond to values that are within the acceptable range for the 5V/3 A determination, which allows for power-sinking devices without the capability of decoding the additional information to still correctly detect the 5V/3 A capability.

According to various embodiments, the encoded communication is in one direction—from the power-sourcing device 102 to power-sinking device 104. The lack of power negotiation between power source and power sink can be useful for providing a simple method to indicate greater than 3 A capability from the power-sourcing device.

Figure 2:
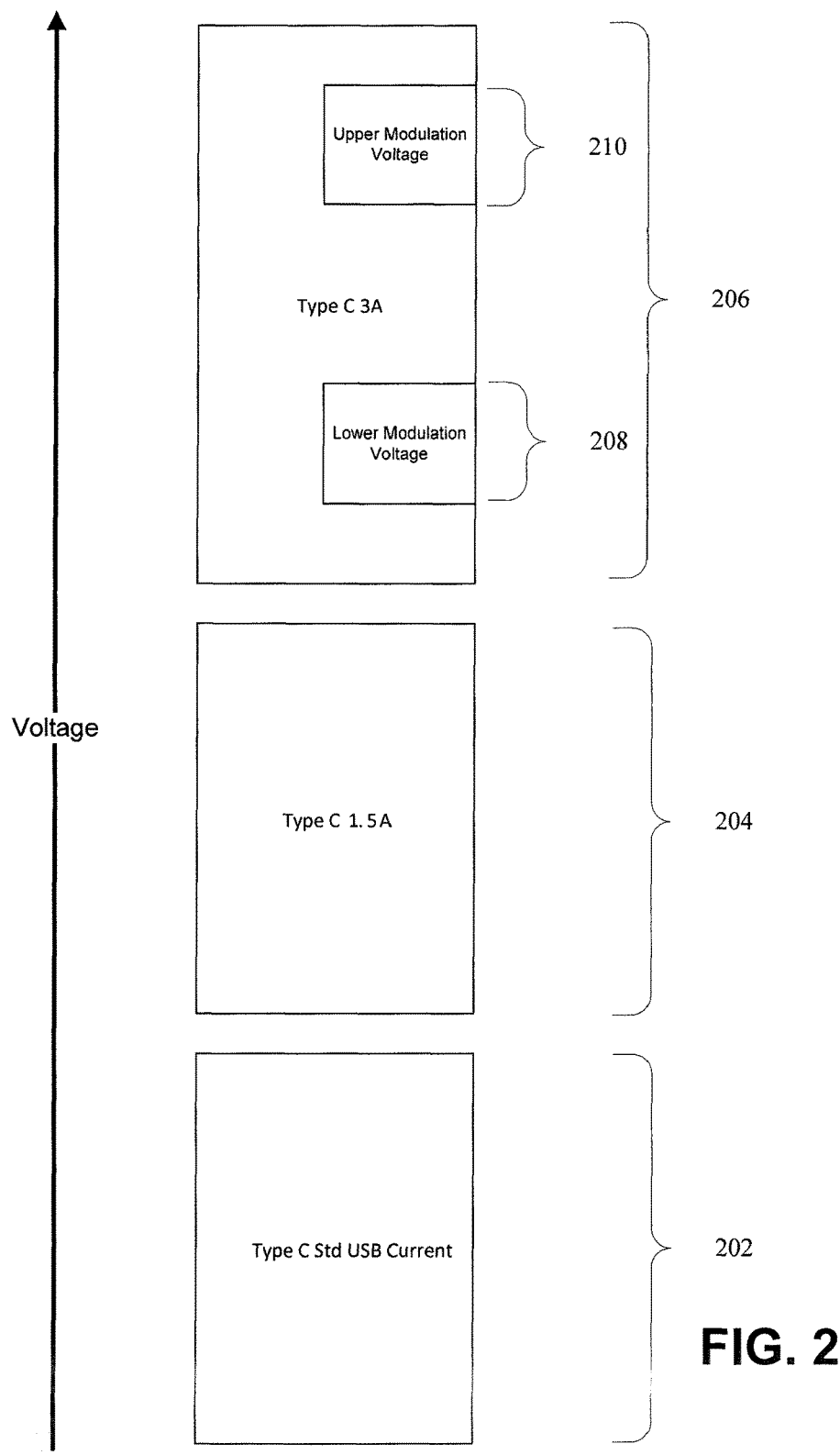
FIG. 2 depicts a set of voltage ranges for communication between a power-sourcing device and a power-sinking device, consistent with embodiments of the present disclosure.

FIG. 2 depicts a set of voltage ranges for communication between a power-sourcing device and a power-sinking device, consistent with embodiments of the present disclosure. While FIG. 2 shows voltage ranges consistent with USB Type C specification, the particular ranges are provided as one example and the various embodiments discussed herein are not necessarily so limited. The voltage ranges 202, 204, and 206, as depicted in FIG. 2, correspond to the three voltage ranges that the USB Type C specification defines to allow a power-sourcing device to indicate available current limit to a power sink. The first voltage range 202 can be used to indicate Standard USB current (<900 mA for USB 3). The second voltage range 204 can be used to indicate 1.5 A current capability. The third voltage range 206 can be used to indicate 3 A current capability.

According to embodiments of the presented disclosure, communication signals can be generated by varying the voltage on the wire between the voltage ranges 208 and 210, each of which are within the third voltage (3 A) range 206. This voltage variation can be used to encode data that indicates additional power-sourcing capabilities, such as higher current levels. The use of communications based upon varying the voltage between voltage levels 208 and 210 in the 3 A range can be particularly useful for allowing the use of components already used to support USB Type C solutions. The same uses of communications can also be useful for being transparent to devices which do not support the communications, including USB compliance testers. Moreover, the approach allows for changes to the communications that facilitate the addition of new functionality in the future. For instance, new data communication packets can be defined using the same voltage variation and encoding, but specifying different power-sourcing capabilities, or other functions.

The particular values for the different voltage ranges can vary according to the specific implementation, including the protocols used, the data transfer rates, and the accuracy for the components of the relevant circuits.

Figure 3:
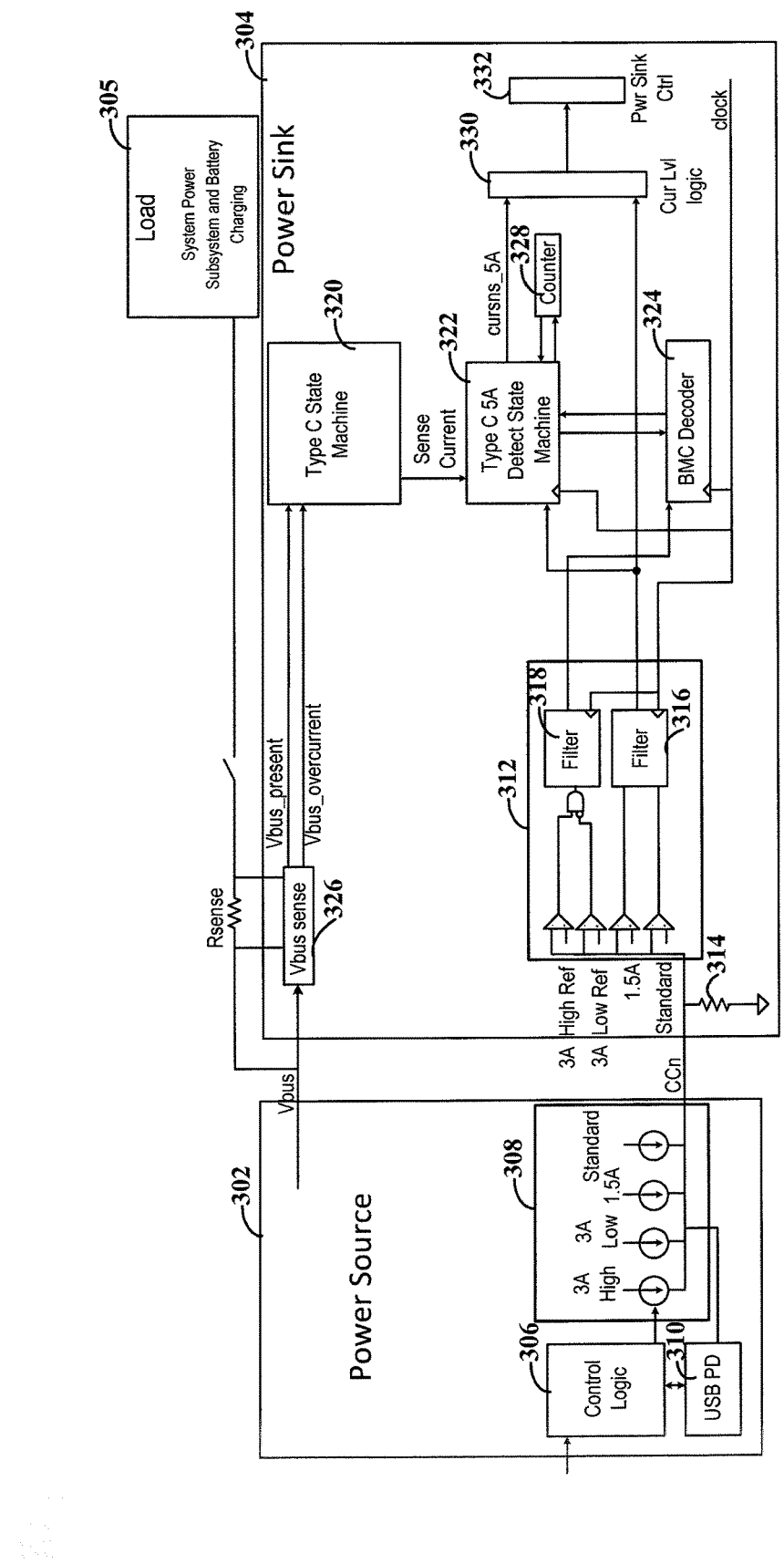
FIG. 3 depicts a block diagram for a system designed to communicate additional current-sourcing capabilities within the USB protocol, consistent with embodiments of the present disclosure.

FIG. 3 depicts a block diagram for a system designed to communicate additional current-sourcing capabilities within the USB protocol, consistent with embodiments of the present disclosure. Power source 302 functions as a power sourcing device that is configured to communicate with power sink 304 and provide power thereto for powering a load 305. Load 305 can include system power and battery charging, among other power consuming components. The system can include a Type C state machine 320 that is configured to detect connection events for a USB Type C cable being connected between the power source 302 and power sink 304. Upon detection of a connection event, a Type C connect sequence can then take place during which both sides resolve which is going to be the power source and which is going to be the power sink.

The device that is determined to be the power source can then start driving Vbus power on the USB Cable. The initial power level provided can be limited to a low (safe) level of current such as Std USB, 1.5 A, or 3 A. The power source 302 can indicate the corresponding power level by driving a particular voltage level on the configuration channel (CC) line, e.g., by having control logic 306 set the particular voltage using voltage control circuit 308. In some embodiments, voltage control circuit 308 can include a number of selectable current sources or selectable pullup resistors.

Consistent with various embodiments, the power source 302 can also detect the capabilities of the cable that connects to the power sink 304. For instance, the power source may be configured to perform this detection if it is capable of providing more than 3 A of current, which may be more current than some cables are designed to accommodate. There are a number of different mechanisms that can be used to perform this detection.

If the power source 302 is capable of providing more than 3 A of current, and the cable is not determined to be incompatible with additional current, the power source 302 can be configured to communicate additional power-sourcing capabilities by selectively enabling the 3 A low and 3 A high current sources. In particular, control logic 306 can be configured to encode data on the CC line by selectively enabling these two current sources to produce voltage variations that correspond to the desired encoded signal. It is noted that each of these current sources is within the acceptable range for the 3 A indication. Accordingly, either can also be used to provide the indication of 3 A capabilities in the prior indication stage.

According to some embodiments, the power source 302 can also be configured to communicate using USB PD, as shown by block 310. The determination as to whether to use USB PD or the 3 A low and 3 A high current sources to communicate additional power-sourcing capabilities can be made based upon a number of factors. For instance, the control logic 306 could attempt to first communicate using USB PD, and if unsuccessful, then attempt to communicate using the 3 A low and 3 A high current sources. Alternatively, control logic could first attempt to communicate using the 3 A low and 3 A high current sources, and if unsuccessful, then attempt to communicate using USB PD.

Consistent with various embodiments, the power sink 304 can be configured to detect the current level that the power source 302 is capable of providing. This can include the use of a pull-down resistor 314 in conjunction with a voltage detection circuit 312. If indication from the power source 302 corresponds to either the standard USB or 1.5 A then the power sink 304 can be configured to assume that there is no additional power-sourcing capabilities to be communicated. If the power source 302 indicates 3 A power-sourcing capabilities, then the power sink 304 can be configured to monitor for an indication of additional power-sourcing capabilities (e.g., current>3.0 A). This monitoring can be carried out by looking for transitions between the 3 A low voltage range and the 3 A high voltage range, as indicated in FIG. 2. As depicted in FIG. 3, the voltage detection circuit 312 can include comparator circuits that are configured to detect such transitions.

Consistent with embodiments, the 3 A low and 3 A high voltage levels used to signal low and high levels on the CC line and these levels can be used to encode data. For instance, BMC can be used to communicate 1's and 0's in the transmission of data. Note that while BMC can be used for signal coding that is consistent with the USB PD specification, various embodiments are designed with modifications relative to the USB PD specification. For instance, the packet protocol can be modified to include only a short preamble, start of packet, and end of packet. The bit timing can be different (e.g., a slower data rate can help to reduce complexity of the transmitter and receiver), and the tristate level can be removed (e.g., instead of a tristate condition, the same level as the 3 A low level can be used).

BMC includes a transition at the start of every bit time (UI) and there is a second transition in the middle of the UI when a '1' is transmitted. The CC line can be held in tristate (except the Type C pullups and pulldowns) when communication is not occurring. The first bit of a packet is always a "0" with a low level as the first level driven after leaving the tristate condition. Each packet consists of a preamble (e.g., 16 bits), a start of packet (SOP or SOP'), and an end of packet (EOP). In certain embodiments, the preamble (except its length), SOP/SOP', and EOP can be the same as defined in the USB PD Specification, as is the start of packet transmission and the end of packet transmission.

The SOP and SOP' sync patterns can be represented by respective sets of four sequences of five bit K-Codes. The different 5-bit K-codes in each set can be referred to by the base term "Sync" followed by a corresponding numeral (e.g., Sync1, Sync2, or Sync3.). For instance, SOP=Sync1, Sync1, Sync1, Sync2, SOP'=Sync1, Sync1, Sync3, Sync3. The EOP can be a single K-Code sequence that corresponds to an EOP.

While various embodiments are discussed in the context of the SOP, SOP', and EOP as defined in the USB PD Specification, various custom K-Code sequences could be used instead to pass data. These different SOP/EOP sequences could signify different information. Moreover, while the SOP/EOP combination can signify 5 A and SOP'/EOP to indicate 3 A current capability from the Power Source, other combinations could be used to indicate different (higher) current levels.

According to embodiments, filter 316 can be configured for use in detecting standard USB and 1.5 A voltage levels on the CC line. Filter 316 is connected to the voltage comparators that detect the standard USB and 1.5 A current levels. Filter 316 can be configured to function as a debounce filter that provides an output indicating one of standard USB, 1.5 A, and 3 A (e.g., 00, 01, and 11, respectively). The filter 316 can be configured with a debounce setting that is designed to avoid spurious transitions due to communications on the CC line. In this manner, the filter can be set to maintain a present output value until the CC line has been at a constant level for more than set time period, where the time period is set to exclude voltage changes due to communications occurring on the CC line.

Consistent with various embodiments, filter 318 can be configured to filter noise from switching between 3 A low and 3 A high levels. Filter 318 can be connected to the voltage comparators monitoring for the 3 A low and 3 A high levels. The filter debounce time period can be set longer than expected noise, but shorter than the data transaction rate between 3 A low and 3 A high levels so as not to impede data recovery by the power sink 304. Consistent with various embodiments, filters 316 and 318 can be implemented in the analog realm, the digital realm, or a combination thereof.

A BMC decoder block 324 can be configured to decode data encoded using voltage transitions between the 3 A low and 3 A high levels. The BMC decoder block 324 can receive upon the output of the filter 318 and decode the data therefrom. For BMC decoding, this may include recovering the clock from the input data stream and detecting the presence or absence of data transitions on the negative edge of the clock signal. The result of the data can then be provided to the type C 5 A detect state machine 322. The type C 5 A detect state machine 322 can be configured to determine the power-sourcing capabilities based upon the outputs of the filter circuits, a reset state, and data provided from the BMC decoder block 324. The type C 5 A detect state machine 322 can be configured to use a counter circuit 328 to detect timeout conditions.

Current level logic block 330 can be configured to provide an indication of the appropriate current capabilities for the power source 302 to the power sink control circuit 332. The power sink control circuit 332 can be configured to set the power draw of the load 305. According to embodiments, the current level logic block 330 can determine whether the current capabilities are consistent with standard USB, 1.5 A or 3 A based upon the output of filter 316. If the capabilities are determined to be consistent with 3 A, then the current level logic block 330 can also be configured to determine whether additional current capabilities (e.g., 5 A) were detected by the type C 5 A detect state machine 322.

Consistent with embodiments of the present disclosure, a Vbus sense circuit 326 can be configured to detect the presence of a Vbus voltage, which can indicate a connected cable. In certain embodiments, the Vbus sense circuit 326 can also be configured to detect overcurrent conditions for a 5 A mode, such as may occur if the attached cable is not designed for 5 A. According to embodiments, if an indication of current >3 A is detected, then the Vbus sense circuit 326 can optionally be configured to detect the overcurrent condition by looking at Vbus voltage. This may include comparing the Vbus voltage to a reference voltage that is set based upon the expected Vbus voltage to be provided by the power source 302. In this case, "overcurrent" refers to current levels which exceed the limits of the cable, not to currents in excess of the 5 A level. Upon overcurrent detection, the Vbus sense circuit can provide an indication that the system is only designed with 3 A capabilities (rather than 5 A) and thereby draw less current to accommodate the capabilities of the cable.

According to various embodiments, overcurrent detection may be performed in various ways. In some instances, a system can detect a voltage drop across the cable, which can indicate excessive current relative to the capabilities of the cable. Some implementations can include hysteresis around a threshold voltage level (indicating excess voltage drop) as well as a short debounce period. This can be particularly useful for protecting against spurious overcurrent detection due to momentary drops in voltage, which can be due to noise or occur while the battery charging first begins.

In various instances, the Vbus sense circuit 326 can be configured to first monitor the voltage on the Vbus line while it is drawing 3 A. When the power sink transitions to the 5 A mode, where it can begin drawing additional current, the Vbus sense circuit can detect an overcurrent condition relative to a change (or "delta") in the Vbus voltage relative to the monitored Vbus voltage at the 3 A current draw. If the delta voltage is determined to be greater than a predetermined level, the Vbus sense circuit 326 can provide an overcurrent indication. For example, the monitored voltage while drawing 3 A might be 4.5V. After switching to 5 A, a further drop of 500 mV may be considered as an "overcurrent" condition (e.g., 4.0V is detected at 5 A).

Figure 4:
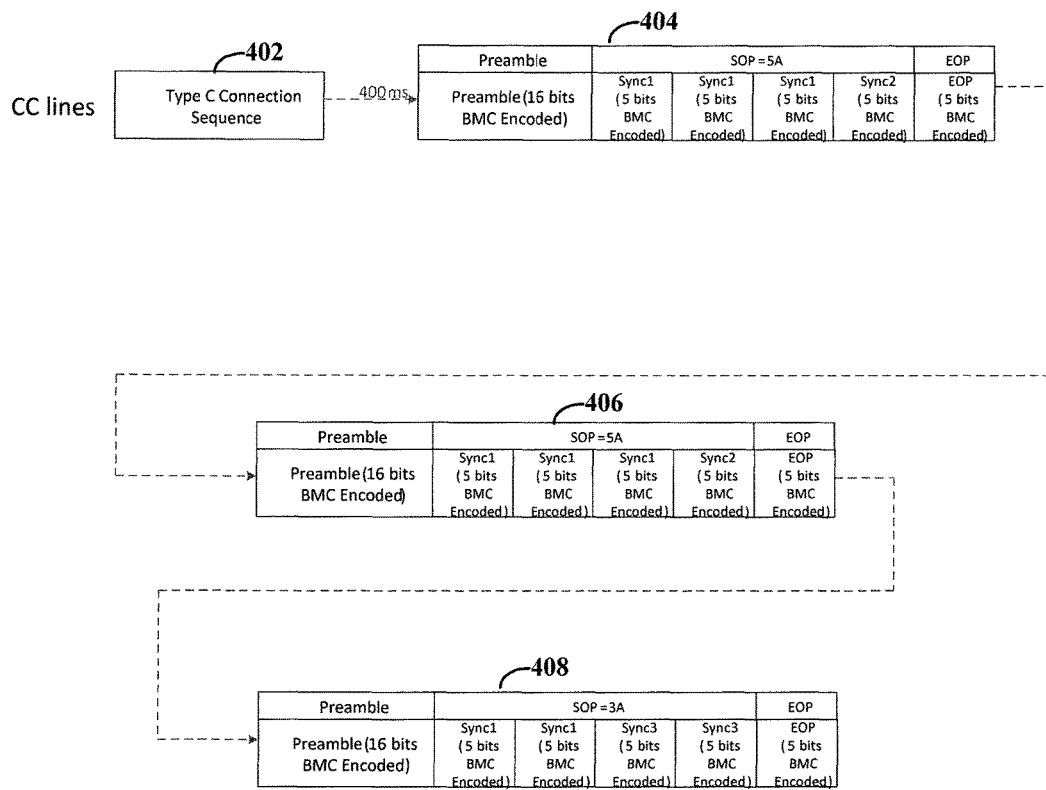
FIG. 4 depicts a flow diagram with example data packets, consistent with embodiments of the present disclosure.

FIG. 4 depicts a flow diagram with example data packets, consistent with embodiments of the present disclosure. The flow begins with a type c connection sequence 402. During this connection sequence the power source device and power sink device can each detect and negotiate which device is the source and which device is the sink. Also during this connection sequence, the power source device can provide an indication that it has power sourcing capabilities of at least 3 A by setting appropriate pull-up values on the CC line. Once this connection sequence is completed, the power source device can be configured to use voltage variations (e.g., between the 3 A low and 3 A high levels) within the 3 A voltage range to transmit data in the form of encoded data packets 404, 406, and 408.

Various embodiments recognize that the sink may not be immediately ready for receipt and decoding of data transmitted over the CC wire. For instance, the Power Sink may take several hundred milliseconds after the Vbus is provided before it senses the connection. This can be due to a variety of factors, such as the power sink device might not be powered until the power source device is connected and provides power over the Vbus wire. The power sink device may need time to reach stable supply voltages and to then initialize the various logic blocks and circuits. Accordingly, the power source device can delay the transmission of the data packet 404 to allow enough time for the power sink device to be capable of decoding the transmission. As discussed herein, the power source device may be configured to continually retransmit the packet 404 (e.g., as shown by packet 406) during a similar delay period, which also allows for sufficient time.

According to embodiments, packets 404 and 406 contain sync patterns that correspond to the SOP (sync1-sync1-sync1-sync2) and EOP data fields, which are defined in the USB PD specification. The depicted combination (short preamble-SOP-EOP) can be used to indicate 5 A capability to the power sink device. Packet 408 contains sync patterns that correspond to SOP' (sync1-sync1-sync3-sync3), which is defined in the USB PD specification. The depicted combination (short preamble-SOP'-EOP) can be used to indicate 3 A capability. In the sequence of packets shown, the transmission of packet 408 can be used to indicate a change in the power-sourcing capabilities of the power source device. In the depicted example, the change is from 5 A to 3 A. The power sink device can therefore be configured to continuously monitor for data packets transmitted on the CC line. If such a change is detected, the power sink device can provide an appropriate indication to the system and logic that controls the draw of the load for the power sink device.

Various aspects of the present disclosure relate to the flexibility in the communications. This includes the use of different data packet formats, different encoding solutions, and combinations thereof. As such, the depicted data packets are provided as an example of one such solution and are not meant to be limiting.

According to certain embodiments, either (or both) of the power source device and the power sink device may also be configured to use USB PD communications. As the USB PD communications can be transmitted on the CC line, the power source device can be configured to wait for a time period that exceeds the USB PD communications window. This can help to guarantee that the power sink device has sensed the connection and that any USB PD communications are completed. In certain embodiments, the power source device may be configured to send the 5 A indication repeatedly and without limitation so as to guarantee that the indication is provided after a sufficiently long delay period.

Figure 5:
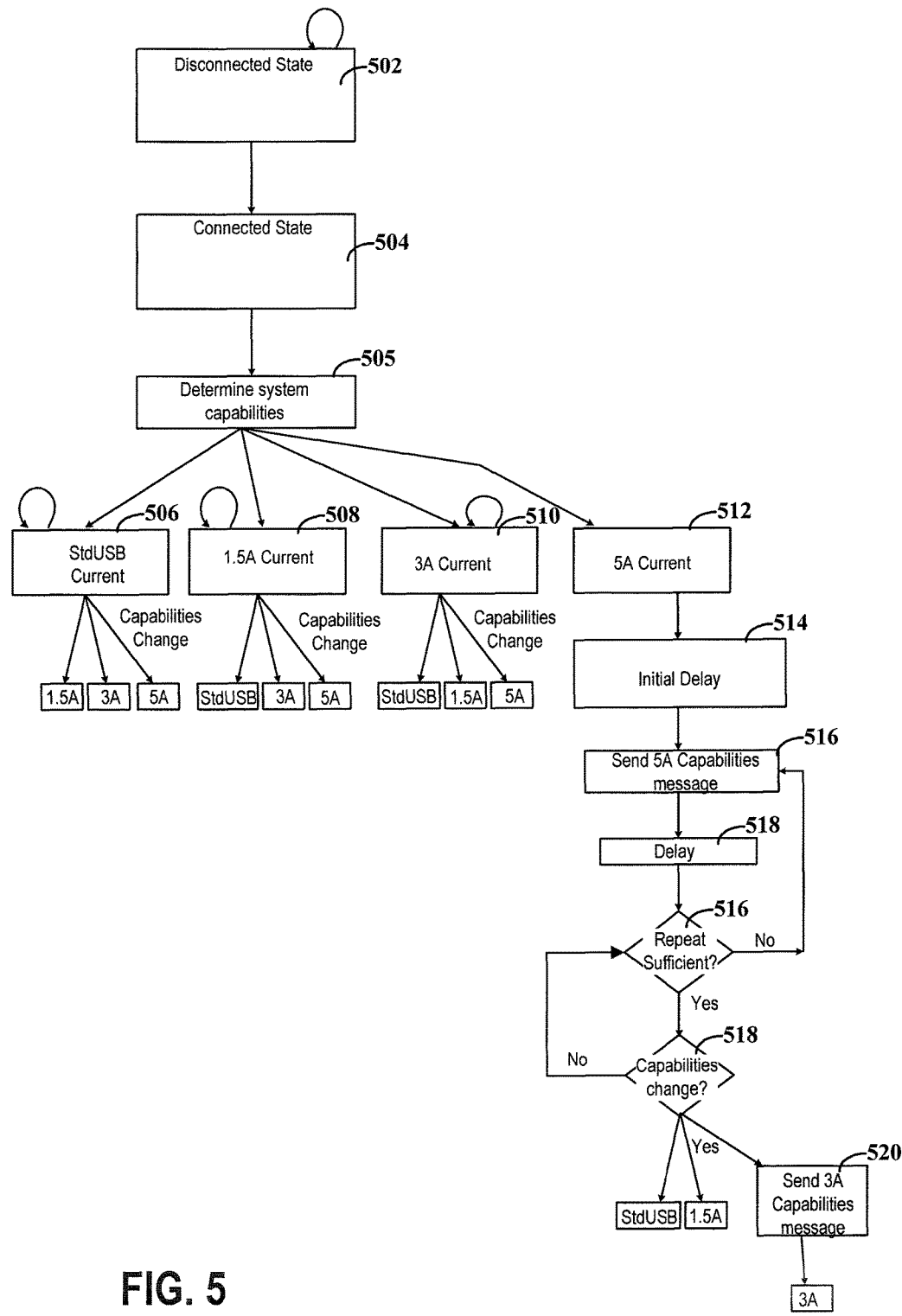
FIG. 5 depicts a flow diagram for a power source device, consistent with embodiments of the present disclosure.

FIG. 5 depicts a flow diagram for a power source device, consistent with embodiments of the present disclosure. The flow diagram begins with the power source device in a disconnected state 502. As per the USB type C specification, the power source device enters a connected state 504 when it detects a connection. Although not expressly depicted, anytime a disconnect event is detected, the power source device can reenter the disconnected state 502, where it will monitor for a connection event. This is true from any block in the flow diagram.

Once connected, the power source device can determine its system capabilities, per block 505. For instance, the power source device may have a USB chip that is generic in that it can be used with multiple different power source devices, which can each have different power-sourcing capabilities. The USB chip can receive an indication of the power-sourcing capabilities from an input on the USB chip. Moreover, the power source device can change sourcing capabilities for a variety of different reasons. For instance, the power sourcing device may change power sourcing capabilities based upon whether it is running off a battery or off of a more stable power source (e.g., plugged into an external power source such as a wall outlet or power brick).

If the power-sourcing device is configured to only deliver one of standard (Std) USB, 1.5 A, or 3 A, then the power sourcing device can proceed to the corresponding blocks 506, 508, and 510, respectively. In these blocks, the power sourcing device can use the USB type C protocols to indicate the appropriate power-sourcing capabilities. From any of these blocks 506, 508, and 510, the power-sourcing device can transition to any of the other possible capabilities, as indicated by the arrows labeled with "capabilities change" and the blocks labeled with the corresponding current amounts.

If the power-sourcing device is configured to provide 5 A, then the power sourcing-device can enter the 5 A current state, indicated by block 512. In this state, the power-sourcing device can indicate a 3 A capability by driving the CC wire to within a corresponding voltage range (using an appropriate pull-up or current source). In some embodiments, the power-sourcing device can then wait for an initial delay to allow the power-sink device time to be ready to receive the message, as indicated by block 514. According to various embodiments, the power-sourcing device can be configured to then send a 5 A capabilities message, as indicated by block 516. As discussed herein, the message can be transmitted by varying the voltage on the CC wire, while maintaining the voltage within the voltage range that corresponds to the 3 A capability.

As a particular example, the delay may be based upon the minimum tCCDebounce time (100 ms) and have a large Vbus turn on time (upwards of 275 ms as described in the Type C specification). The power-sink device may use the maximum tCCDebounce time (200 ms), which results in the power-source device potentially reaching a connected state around 375 ms before the power-sink device reaches the connected state. If the power-sink device waits for a proper 3 A indication before looking for the 5 A Capabilities message, an additional tPDDebounce can be included to determine the minimum delay time. The particular numbers in this example are not limiting. For instance, the numbers can be different for different specifications and they may also change if the USB Type C specification changes. Moreover various embodiments can build in additional delay time to allow for more margin of error and for potential future changes.

According to some embodiments, the power-sourcing device can be configured to wait a sufficient time for the packet containing the message to be transmitted, per block 518. In some instances, the power-sourcing device can repeat the message a sufficient number of times to guarantee that a power-sinking device has sufficient time to receive and decode the message, as indicated by decision block 516. The decision made in block 516 can be based upon a variety of different criteria. For example, the message could be repeated indefinitely (or at least until a change in capabilities is detected), a set number of times, or a timer could be used such that the message is repeated for a set amount of time. Combinations of these and other solutions are also possible.

In various implementations, the power-sourcing device can be configured to accommodate a dynamic change to the power-sourcing capabilities of the power-sourcing device. If such a change is determined, per decision block 518, the power-sourcing device can be configured to provide an indication of the new capabilities to the power-sinking device and then transition to the appropriate new state, as indicated by the arrows and blocks. For the standard (std) USB and 1.5 A capabilities, the new state can be indicated by changing the voltage on the CC wire (e.g., by selecting a corresponding pullup or current source). In the case of 3 A capabilities, the voltage on the CC wire is already within the 3 A voltage range because the 5 A capability messages are communicated using voltages that are maintained with the 3 A voltage range. Accordingly, the power-sourcing device can be configured to transmit a data message indicating 3 A capabilities, as indicated by block 520.

Figure 6:
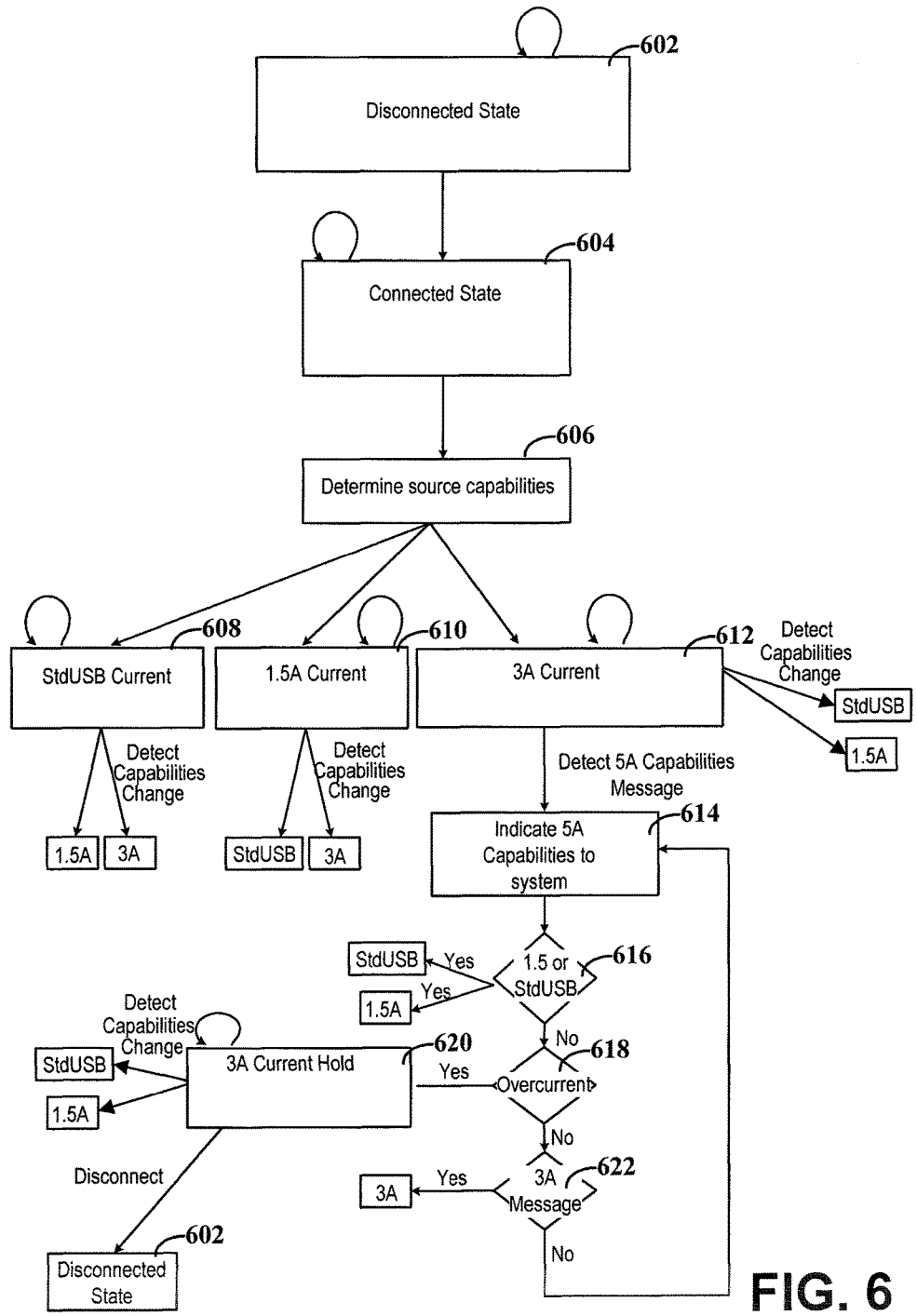
FIG. 6 depicts a flow diagram for a power-sink device, consistent with embodiments of the present disclosure.

FIG. 6 depicts a flow diagram for a power-sink device, consistent with embodiments of the present disclosure. The flow diagram begins with the power-sink device in a disconnected state 602. As per the USB type C specification when the power-sink device detects a connection it enters a connected state 604. Although not expressly depicted, anytime a disconnect event is detected, the power-sink device can reenter the disconnected state 602, where it will monitor for a connection event. This is true from any block in the flow diagram.

Once connected, the power-sink device can determine the power-sourcing capabilities of the power-sourcing device, per block 606. If the power-sourcing device is detected as being capable of delivering only standard (Std) USB or 1.5 A, then the power sinking device can proceed to the corresponding blocks 608 and 610, respectively. In these blocks, the power-sinking device can configure the load of the power-sinking device to draw the appropriate amount of power.

Consistent with embodiments of the present disclosure, the determination indicated in block 606 can be continually performed to allow for dynamic changes to the power-sourcing capabilities. Thus, from either of the blocks 608 and 610, the power-sinking device can be configured to transition to any of the other possible capabilities, as indicated by the arrows labeled with "detect capabilities change" and the blocks labeled with the corresponding current amounts.

If 3 A power-sourcing capabilities are detected (e.g., by the voltage range on the CC line being set by using a pullup or current source), then the power-sink device can be configured to enter the 3 A current state, per block 612. The power-sink device can remain in the 3 A state until a change of capabilities is detected to Std USB or 1.5 A, in which case the power-sink device can transition to Std USB or 1.5 A. A capabilities change can also occur if an incoming 5 A capabilities message is detected. Upon detection of a 5 A capabilities message, the power-sink device can enter a 5 A capabilities state and indicate the additional power-sourcing capabilities to the rest of the power-sink system, per block 614.

Consistent with various embodiments, the power-sink device can continue to monitor for changes in the power-source capabilities. This can include monitoring for the voltage on the CC line being set to the standard USB or 1.5 A voltage ranges, per block 616. The power-sink device can respond to detecting this change by transitioning to the corresponding state and indicating the new current capabilities to the circuit controlling the power drawn by the load of the power-sink device.

According to certain embodiments, the power-sink device can be configured to detect an overcurrent condition, per block 618. As discussed herein, the overcurrent condition might be detected by monitoring the current on the Vbus wire. If an overcurrent condition is detected, then the power-sink device can transition to a 3 A holding state, per block 620. This holding state can prevent the power-sink device from transitioning back to the 5 A state, which might lead to constant transitioning between the 5 A and 3 A states. The 3 A hold state can still be exited if a disconnect event is detected. Once a disconnect event occurs, a subsequent connection event may involve a different power-source device, a different cable, or both. Accordingly, the flow can be restarted, including the possibility of reentering the 5 A state. In some embodiments, the hold state can also be exited upon a detected capabilities change to Std USB or 1.5 A.

The power-sink device can also monitor for a 3 A capability message, per block 622. If the power-sink device detects a 3 A capability message, the power-sink device can enter the 3 A state (block 612). As the transition was not due to an overcurrent state, the power-sink device can conceivably reenter the 5 A state if a 5 A capability message is subsequently received.

Figure 7:
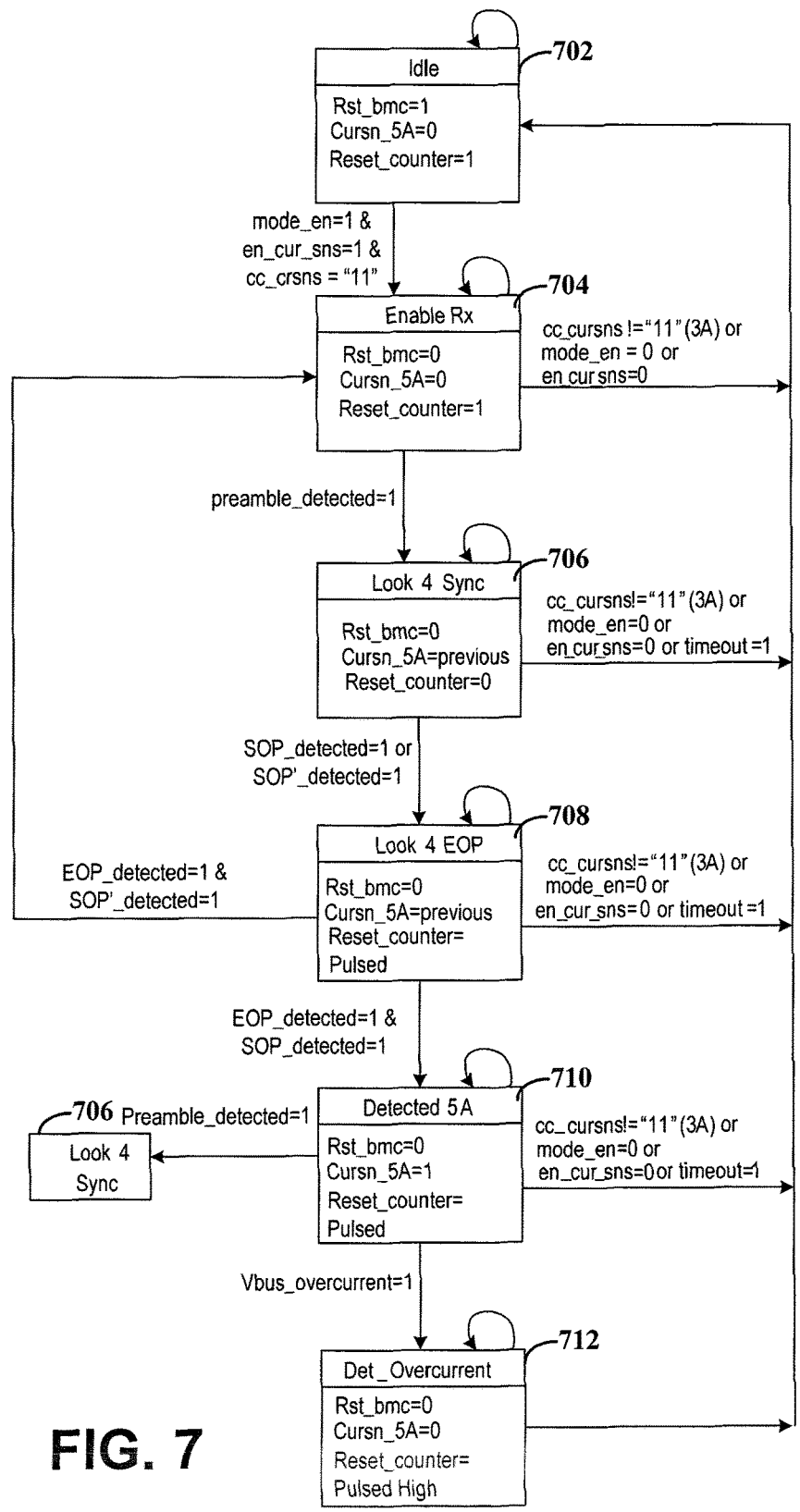
FIG. 7 depicts a flow diagram for use with a state machine for detecting additional power-sourcing capabilities, consistent with embodiments of the present disclosure.

FIG. 7 depicts a flow diagram for use with a state machine for detecting additional power-sourcing capabilities, consistent with embodiments of the present disclosure. The flow depicted in FIG. 7 can be used in connection with various embodiments discussed herein including the type C 5 A detect state machine discussed in connection with FIG. 3.

The state machine can begin in the idle state 702, which can occur upon system power on, a system level reset, or a similar event. In the idle state 702, the state machine can reset the (BMC) decoder, as represented by the signal "Rst_bmc=1." Additionally, local counter(s), which can be used for timeout events, can be reset, as represented by the signal "Reset_counter=1." Further the value "Cursn_5 A=0" indicates that the power-sink device is not in 5 A mode.

Consistent with certain embodiments, the state machine can receive an enable input "mode_en" that determines whether or not the 5 A capabilities are to be used. If the logic is enabled (mode_en=1), the system is connected to a power-sourcing device (en_cur_sns=1), and the filtered current sense indication is at "3 A" (cc_crsns="11"), then the state machine transitions to the enable_rx state 704.

As part of the enable_rx state 704, the state machine can take the BMC decoder out of reset to allow processing of incoming current capabilities messages. If the state machine detects that the power-sourcing device has indicated less than 3 A (cc_cursns !="3 A"), a disconnect condition has occured (en_cursns=0), or the 5 A functionality has been disabled (mode_en=0), then the state machine can transition back to the idle state 702. If the state machine determines that a preamble was detected (as might be provided by a BMC decoder block for FIG. 3), then the state machine can enter the look_4_sync state 706.

During the look_4_sync state 706 the state machine can be configured to wait for the BMC decoder to report that an SOP (SOP_detected=1) or SOP'(SOP'_detected=1) was detected. If the state machine determines that an SOP or SOP' data pattern was detected, then the state machine can advance to the look_4_EOP state 708. As discussed herein, a counter can be used to detect timeout conditions. For example, the timeout can be sufficiently long to cover the expected SOP/SOP' length (e.g., 20 bits). Additionally, the state machine can return to the idle state 702 if it detects that the power-sourcing device has indicated less than 3 A (cc_cursns !="3 A"), a disconnect condition is detected (en_cur_sns=0), a timeout has occurred waiting for the SOP/SOP' (timeout=1), or the function is disabled by the system (mode_en=0).

During the look_4_EOP state 708, the state machine can wait for the detection of an EOP message (EOP_detected=1). If an EOP is detected and an SOP message was detected (SOP_detected=1) then the state machine can move to the detected 5 A state 710. In various implementations, the counter can be reset upon entering the state, and then allowed to run in order to provide a new timeout count for the EOP message. Other conditions for leaving the look_4_EOP state 708 include the power-source device indicating less than 3 A (cc_cursns !="3 A"), detecting a disconnect condition (en_cur_sns=0), a timeout has occurred waiting for the EOP (timeout=1), or the 5 A function is disabled by the system (mode_en=0). In each of these situations the state machine will transition back to the idle state 702. The look_4_EOP state 708 can also be left if a 3 A capabilities message is received (EOP_detected=1 & SOP'_detected=1). In this situation, the state machine can return to the enable_rx state 704.

While in the detected_5 A state 710, the state machine can provide an indication of the 5 A current-sourcing capabilities (Cursn_5 A=1) and can also briefly reset the counter (Reset_counter=Pulsed). The state machine can return to the idle state 702 if it detects that the power-sourcing device has indicated less than 3 A (cc_cursns !="3 A"), a disconnect condition has occurred (en_cur_sns=0), or the 5 A function is disabled (mode_en=0). In certain embodiments, the power-sourcing device can be configured to periodically resend the 5 A capablities message. In such a situation, the state machine can implement a timeout while waiting for the next 5 A. If the timeout occurs before another preamble is detected (timeout=1), the state machine can return to idle state 702.

If the state machine detected reception of another preamble, then the state machine can transition to the look_4_sync state 706 to process the incoming message. During the look_4_sync state 706 the sink current level can be maintained at the current value (5 A). If an overcurrent situation is detected (vbus_overcurrent=1) then the state machine can be configured to transition to the det_overcurrent state 712. In the det_overcurrent state 712, the state machine can reset the sink current level indication back to 3 A, and then transitions back to the idle state 702.

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, an apparatus can be configured for use with different types of communication protocols and configurations than those illustrated by the figures. Such modifications do not depart from the true spirit and scope of various aspects of the invention, including aspects set forth in the claims.

What is claimed is:

1. An apparatus for use with a protocol that specifies a power-sourcing voltage range that indicates power sourcing capabilities and for communicating additional power sourcing capabilities using voltage variations within the power-sourcing voltage range, the apparatus comprising:
a power-sourcing device configured to provide power to an external power-sinking device over a wired connection containing a plurality of wires, the power-sourcing device including:
a voltage control circuit configured to drive a voltage over a wire of the plurality of wires; and
processing circuitry configured to:
communicate to the external power-sinking device, using the voltage control circuit, first power-sourcing capabilities to the external power-sinking device by setting the voltage over the wire to a value within the power-sourcing voltage range specified by the protocol; and
communicate encoded data to the external power-sinking device, using the voltage control circuit, the encoded data indicating the additional power sourcing capabilities of the power-sourcing device and generated by varying the voltage over the wire to varying voltage values, the voltage variations maintaining voltage on the wire within the power-sourcing voltage range specified by the protocol.

2. The apparatus of claim 1, wherein the processing circuitry is further configured to sense current capabilities of a cable connecting the power-sourcing device to the external power-sinking device and to set the power-sourcing capabilities of the power-sourcing device in response to the current capabilities of the cable.

3. The apparatus of claim 1, wherein the processing circuitry is further configured to receive an indication of power-sourcing capabilities of the power-sourcing device and set the power provided to the power-sinking device in response to the indication of power-sourcing capabilities.

4. The apparatus of claim 1, wherein the processing circuitry is further configured to generate the encoded data using biphase mark coding to generate a packet that communicates to the power-sinking device, the power-sourcing capabilities of the power-sourcing device.

5. The apparatus of claim 4, wherein the processing circuitry is further configured to communicate a subsequent packet that indicates a change to the power-sourcing capabilities of the power-sourcing device.

6. The apparatus of claim 1, wherein the power-sourcing device is compliant with Universal Serial Bus Type C.

7. The apparatus of claim 6, wherein the power-sourcing voltage range corresponds to a voltage range specified for USB type C and 3 Amperes of power-sourcing capability.

8. The apparatus of claim 7, wherein the wire of the plurality of wires is a configuration channel (CC) line.

9. The apparatus of claim 7, wherein the voltage control circuit is configured to produce the voltage variations on the wire by driving the wire to two voltages within the power-sourcing voltage range.

10. An apparatus for use with a protocol that specifies a power-sourcing voltage range that indicates power-sourcing capabilities and for communicating additional power-sourcing capabilities using voltage variations within the power-sourcing voltage range, the apparatus comprising:
a power-sinking device configured to receive power from an external power-sourcing device over a wired connection containing a plurality of wires, the power-sinking device including:
a voltage circuit configured to detect a voltage that is provided over the plurality of wires; and
processing circuitry configured to:
determine power-sourcing capabilities of the external power-sourcing device based upon the detected voltage being within the power-sourcing voltage range specified by the protocol; and
responsive to receipt of data encoded by the power-sourcing device using voltage variations on the wire, determine the additional power-sourcing capabilities of the power-sourcing device by decoding the encoded data, the voltage variations maintaining voltage on the wire within the power-sourcing voltage ranges specified by the protocol.

11. The apparatus of claim 10, wherein the processing circuit is configured to decode the data according to biphase mark coding that includes packets that include data specifying the power-sourcing capabilities of the power-sourcing device.

12. The apparatus of claim 10, wherein the processing circuit is further configured to:
receive an overcurrent condition in response to detecting a change in a monitored voltage resulting from a transition from a first current mode to a second current mode greater than a predetermined current; and
adjust a current drawn by a load of the power-sinking device.

13. The apparatus of claim 10, wherein the power-sinking device is compliant with Universal Serial Bus Type C.

14. The apparatus of claim 11, wherein the packets include a preamble portion, a start of packet portion and an end of packet portion and wherein the start of packet portion includes a synchronization pattern that specifies the power-sourcing capabilities of the power-sourcing device.

15. A method for use with a protocol that specifies a power-sourcing voltage range that indicates power sourcing capabilities and for communicating additional power sourcing capabilities using voltage variations within the power-sourcing voltage range, the method comprising:
providing, from a power-sourcing device, power to an external power-sinking device over a wired connection containing a plurality of wires;
driving, using a voltage control circuit of the power-sourcing device, a voltage over a wire of the plurality of wires;
communicating, using the voltage control circuit and without negotiating power delivery parameters, first power-sourcing capabilities to the external power sinking device by setting the voltage over the wire to a value within the power-sourcing voltage range; and
communicating encoded data to the power-sinking device, using the voltage control circuit, the encoded data indicating the additional power sourcing capabilities of the power-sourcing device and generated using voltage variations on the wire, the voltage variations maintaining voltage on the wire within the power-sourcing voltage range.

16. The method of claim 15, wherein the driving, using the voltage control circuit of the power-sourcing device, a voltage over a wire of the plurality of wires includes setting a pull-up value on the wire.

17. The method of claim 15, wherein the driving, using the voltage control circuit of the power-sourcing device, a voltage over a wire of the plurality of wires includes enabling a particular current-source on the wire.

18. The method of claim 15, wherein the communicating, using the voltage control circuit, the additional power sourcing capabilities includes encoding data using biphase mark coding.

19. An apparatus for use with a protocol that specifies a power-sourcing voltage range that indicates power sourcing capabilities and for communicating additional power sourcing capabilities using voltage variations within the power-sourcing voltage range, the apparatus comprising:
 a power-sourcing device configured to provide power to an external power-sinking device over a wired connection containing a plurality of wires, the power-sourcing device including:
  a voltage control circuit configured to drive a voltage over a wire of the plurality of wires; and
  processing circuitry configured to:
   communicate, using the voltage control circuit, first power-sourcing capabilities to the external power-sinking device by setting the voltage over the wire to a value within the power-sourcing voltage range; and
   communicate encoded data to the power-sinking device, using the voltage control circuit, the encoded data indicating the additional power sourcing capabilities of the power-sourcing device and generated by varying the voltage over the wire to varying voltage values, the voltage variations maintaining voltage on the wire within the power-sourcing voltage range, the varying voltage levels including a first voltage range that indicates a current standard and a second voltage range that indicates a first current capability.

20. The apparatus of claim 19, wherein the varying voltage levels further includes a third voltage range that indicates a second current capability, wherein each of the voltage ranges include a voltage value that is greater than 0V and less than 5V.

* * * * *